(12) United States Patent
Elad et al.

(10) Patent No.: US 12,529,799 B2
(45) Date of Patent: Jan. 20, 2026

(54) MIMO RADAR SIGNALS WITH DOPPLER CODE MULTIPLEXING

(71) Applicant: AyDeeKay LLC, Aliso Viejo, CA (US)

(72) Inventors: Danny Elad, Aliso Viejo, CA (US); Tom Heller, Aliso Viejo, CA (US)

(73) Assignee: AyDeeKay LLC, Aliso Viejo, CA (US)

( * ) Notice: Subject to any disclaimer, the term of this patent is extended or adjusted under 35 U.S.C. 154(b) by 98 days.

(21) Appl. No.: 18/391,203

(22) Filed: Dec. 20, 2023

(65) Prior Publication Data
US 2024/0210568 A1 Jun. 27, 2024

Related U.S. Application Data

(60) Provisional application No. 63/434,445, filed on Dec. 21, 2022.

(51) Int. Cl.
*G01S 19/30* (2010.01)
*G01S 19/29* (2010.01)

(52) U.S. Cl.
CPC ............. *G01S 19/30* (2013.01); *G01S 19/29* (2013.01)

(58) Field of Classification Search
CPC ...................................... G01S 19/30
USPC .......................................... 375/150
See application file for complete search history.

(56) References Cited

U.S. PATENT DOCUMENTS

| | | | |
|---|---|---|---|
| 5,897,605 A * | 4/1999 | Kohli | G01C 21/26 |
| | | | 701/469 |
| 2004/0160933 A1 | 8/2004 | Odenwalder et al. | |
| 2007/0133495 A1 * | 6/2007 | Lee | H04J 13/10 |
| | | | 370/320 |
| 2012/0281780 A1 | 11/2012 | Huang et al. | |
| 2020/0191939 A1 | 6/2020 | Wu et al. | |
| 2020/0233076 A1 | 7/2020 | Chen et al. | |
| 2020/0393553 A1 | 12/2020 | Kishigami et al. | |
| 2021/0278521 A1 * | 9/2021 | Levitan | H04J 13/0014 |
| 2022/0171048 A1 * | 6/2022 | Kishigami | G01S 13/325 |

(Continued)

OTHER PUBLICATIONS

Knill et al., "Coded OFDM Waveforms for MIMO Radars," IEEE Transactions on Vehicular Technology. (2021), 70(9), 8769-8780.

(Continued)

*Primary Examiner* — Lihong Yu
(74) *Attorney, Agent, or Firm* — Steven Stupp

(57) ABSTRACT

An integrated circuit may include K transmit circuits that output K transmit signals, where K is a non-zero integer and the K transmit signals are encoded using first Doppler code multiplexing. Moreover, the integrated circuit may include L receive circuits that provide L receive signals (which may correspond to the K transmit signals), where L is a non-zero integer and the L receive signals are encoded using second Doppler code multiplexing. Note that the first and/or the second Doppler code multiplexing may be different from Doppler division multiplexing. Furthermore, the first Doppler code multiplexing may include selectively Doppler shifting a $k^{th}$ transmit signal in the K transmit signals by $n_k$ bins between chirps in a frame, and the second Doppler code multiplexing may include selectively Doppler shifting an $l^{th}$ receive signal in the L transmit signals by $n_l$ bins between the chirps in the frame.

20 Claims, 24 Drawing Sheets

(56) References Cited

U.S. PATENT DOCUMENTS

2022/0236372 A1   7/2022  Elad et al.
2023/0059058 A1*  2/2023  Kishigami ............ G01S 13/583
2023/0231615 A1   7/2023  Elad et al.

OTHER PUBLICATIONS

PCT International Search Report and Written Opinion, PCT/US2023/085205, Mar. 4, 2024.

* cited by examiner

FIG. 6

MIMO RADAR SIGNALS WITH DOPPLER CODE MULTIPLEXING

CROSS REFERENCE TO RELATED APPLICATIONS

This application claims priority under 35 U.S.C. 119(e) to U.S. Provisional Application Ser. No. 63/434,445, entitled "MIMO Radar Signals with Doppler Code Multiplexing," by Danny Elad et al., filed on Dec. 21, 2022, the contents of both of which are herein incorporated by reference.

FIELD

The present disclosure relates to techniques for encoding multiple-input multiple-output (MIMO) radar signals using Doppler code multiplexing.

BACKGROUND

In order to provide improved safety and more-convenient transportation options, many automotive manufacturers are including additional sensors and/or features in their vehicles. For example, self-driving cars typically include a wide variety of sensors, such as acoustic and/or electromagnetic sensors that monitor the surrounding environment to detect other vehicles, people, animals, or obstacles. However, attempts to detect and mitigate the effects of interference on these sensors have not been wholly satisfactory, which often degrades the performance of associated features.

SUMMARY

Embodiments of a first integrated circuit are described. This first integrated circuit includes K transmit circuits that output K transmit signals, where K is a non-zero integer and the K transmit signals are encoded using first Doppler code multiplexing.

Note that the first Doppler code multiplexing may be different from Doppler division multiplexing.

Moreover, a given transmit signal in the K transmit signals may include M chirps in a frame, where M is a non-zero integer.

Furthermore, in the first Doppler code multiplexing, a $k^{th}$ transmit signal in the K transmit signals may be selectively Doppler shifted by $n_k$ bins, so that a Doppler spectrum corresponding to one or more reflected signals from a single target may have a peak-to-sidelobe ratio (PSLR) greater than or exceeding a predefined value (such as a predefined value associated with Doppler division multiplexing). For example, the selective Doppler shift by $n_k$ bins may be selectively applied between the M chirps in the frame in the $k^{th}$ transmit signal. Note that Doppler spectrum may correspond to an autocorrelation function performed on the one or more reflected signals.

Additionally, in the first Doppler code multiplexing, a phase shift corresponding to the Doppler shifted $n_k$ bins may be selectively applied between the M chirps in the frame in the $k^{th}$ transmit signal. In some embodiments, differences between phase shifts selectively applied to different pairs of transmit signals in the K transmit signals may be different. Note that a difference between the phase shifts applied to a given pair of transmit signals in the K transmit signals may be unique or non-recurring in a set of differences between the phase shifts applied to different pairs of transmit signals in the K transmit signals.

Moreover, the K transmit signals may be encoded using a bipolar phase code (such as a Barker code), where the bipolar phase code changes a phase of a given transmit signal in the K transmit signals within a given frame (such as to the M chirps). In some embodiments, the bipolar phase code may include a nested Barker code.

Furthermore, the first integrated circuit may perform beamforming of the K transmit signals.

Another embodiment provides a second integrated circuit. This second integrated circuit includes L receive circuits that provide L receive signals (which may correspond to the K transmit signals), where L is a non-zero integer and the L receive signals are encoded using second Doppler code multiplexing.

Note that the second Doppler code multiplexing may be different from Doppler division multiplexing.

Moreover, a given receive signal in the L receive signals may include the M chirps in the frame.

Furthermore, in the second Doppler code multiplexing, an $l^{th}$ receive signal in the L receive signals may be selectively Doppler shifted by $n_l$ bins. For example, the selective Doppler shift by $n_l$ bins may be selectively applied between M chirps in the frame in the $l^{th}$ receive signal.

Additionally, in the second Doppler code multiplexing, a phase shift corresponding to the Doppler shifted $n_l$ bins may be selectively applied between the M chirps in the frame in the $l^{th}$ receive signal. In some embodiments, differences between phase shifts selectively applied to different pairs of receive signals in the L receive signals may be different. Note that a difference between the phase shifts applied to a given pair of receive signals in the L receive signals may be unique or non-recurring in a set of differences between the phase shifts applied to different pairs of receive signals in the L receive signals.

Moreover, the second integrated circuit may compute a Doppler spectrum using the L receive signals, where the Doppler spectrum has a PSLR greater than or exceeding a predefined value (such as a predefined value associated with the Doppler division multiplexing). Note that the Doppler spectrum may correspond to an autocorrelation function performed on the L receive signals.

Furthermore, the Doppler spectrum may be computed using a matched filter corresponding to the first and/or the second Doppler code multiplexing. For example, the Doppler spectrum may be implemented in the time domain by multiplying the L receive signals with the matched filter or in the frequency domain by convolving a Fourier transform of the L receive signals and a Fourier transform of the matched filter.

Additionally, the L receive signals may be encoded using a bipolar phase code (such as a Barker code), where the bipolar phase code changes a phase of a given receive signal in the L receive signals within a given frame. Note that the bipolar phase code may include a nested Barker code.

In some embodiments, the second integrated circuit may perform a sidelobe elimination technique. For example, the sidelobe elimination technique may include: recursive coherent sidelobe estimation; non-coherent sidelobe estimation; and/or inter-frame processing.

Moreover, the second integrated circuit may perform beamforming of the L receive signals.

Furthermore, the second integrated circuit may encode the L receive signals using the second Doppler code multiplexing when down converting the L receive signals to baseband or an intermediate carrier frequency that is different from one or more carrier frequencies of the K transmit signals (such as carrier frequencies in a radar band of frequencies).

Another embodiment provides a system. This system includes a first integrated circuit and a second integrated circuit. The first integrated circuit includes K transmit circuits that output K transmit signals, where K is a non-zero integer and the K transmit signals are encoded using first Doppler code multiplexing. Moreover, the second integrated circuit includes L receive circuits that provide L receive signals (which may correspond to the K transmit signals), where L is a non-zero integer and the L receive signals are encoded using second Doppler code multiplexing.

Note that the first and/or the second Doppler code multiplexing may be different from Doppler division multiplexing.

Moreover, a given transmit signal in the K transmit signals may include M chirps in a frame, where M is a non-zero integer. Furthermore, a given receive signal in the L receive signals may include the M chirps in the frame.

Additionally, in the first Doppler code multiplexing, a $k^{th}$ transmit signal in the K transmit signals may be selectively Doppler shifted by $n_k$ bins. For example, the selective Doppler shift by $n_k$ bins may be selectively applied between the M chirps in the frame in the $k^{th}$ transmit signal. In some embodiments, in the second Doppler code multiplexing, an $l^{th}$ receive signal in the L receive signals may be selectively Doppler shifted by $n_l$ bins. For example, the selective Doppler shift by $n_l$ bins may be selectively applied between the M chirps in the frame in the $l^{th}$ receive signal.

Moreover, in the first Doppler code multiplexing, a phase shift corresponding to the Doppler shifted $n_k$ bins may be selectively applied between the M chirps in the frame in the $k^{th}$ transmit signal. Furthermore, differences between phase shifts selectively applied to different pairs of transmit signals in the K transmit signals may be different. Additionally, a difference between the phase shifts applied to a given pair of transmit signals in the K transmit signals may be unique or non-recurring in a set of differences between the phase shifts applied to different pairs of transmit signals in the K transmit signals.

In the second Doppler code multiplexing, note that a phase shift corresponding to the Doppler shifted $n_l$ bins may be selectively applied between the M chirps in the frame in the $l^{th}$ receive signal. Furthermore, differences between phase shifts selectively applied to different pairs of receive signals in the L receive signals may be different. Additionally, a difference between the phase shifts applied to a given pair of receive signals in the L receive signals may be unique or non-recurring in a set of differences between the phase shifts applied to different pairs of receive signals in the L receive signals.

In some embodiments, the second integrated circuit may compute a Doppler spectrum using the L receive signals, where the Doppler spectrum has a PSLR greater than or exceeding a predefined value (such as a predefined value associated with Doppler division multiplexing). Note that the Doppler spectrum may correspond to an autocorrelation function performed on the L receive signals.

Moreover, the Doppler spectrum may be computed using a matched filter corresponding to the first and/or the second Doppler code multiplexing. For example, the Doppler spectrum may be implemented in the time domain by multiplying the L receive signals with the matched filter or in the frequency domain by convolving a Fourier transform of the L receive signals and a Fourier transform of the matched filter.

Furthermore, L may be different from K. For example, K may be four and L may be two.

Additionally, the first Doppler code multiplexing may be different from the second Doppler code multiplexing.

In some embodiments, the K transmit signals and/or the L receive signals may be encoded using one or more bipolar phase codes (such as a Barker code), where the one or more bipolar phase codes change a phase of a given transmit signal in the K transmit signals and/or a given receive signal in the L receive signals within a given frame. Note that the one or more bipolar phase codes may include a nested Barker code. In some embodiments, a first bipolar phase code used in the first integrated circuit is different from a second bipolar phase code used in the second integrated circuit.

Moreover, the second integrated circuit may perform a sidelobe elimination technique. For example, the sidelobe elimination technique may include: recursive coherent sidelobe estimation; non-coherent sidelobe estimation; and/or inter-frame processing.

Furthermore, the first integrated circuit may perform beamforming of the K transmit signals and/or the second integrated circuit may perform beamforming of the L receive signals.

Additionally, the second integrated circuit may encode the L receive signals using the second Doppler code multiplexing when down converting the L receive signals to baseband or an intermediate carrier frequency that is different from one or more carrier frequencies of the K transmit signals.

Another embodiment provides an integrated circuit that includes the functions of the first integrated circuit and the second integrated circuit.

Another embodiment provides an electronic device that includes the first integrated circuit and/or the second integrated circuit.

Another embodiment provides a method for communicating encoded signals. This method includes at least some of the operations performed by the first integrated circuit and/or the second integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

FIG. 6 is a drawing illustrating an example of a matched filter corresponding to Doppler code multiplexing in a transmit circuit according to some embodiments of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
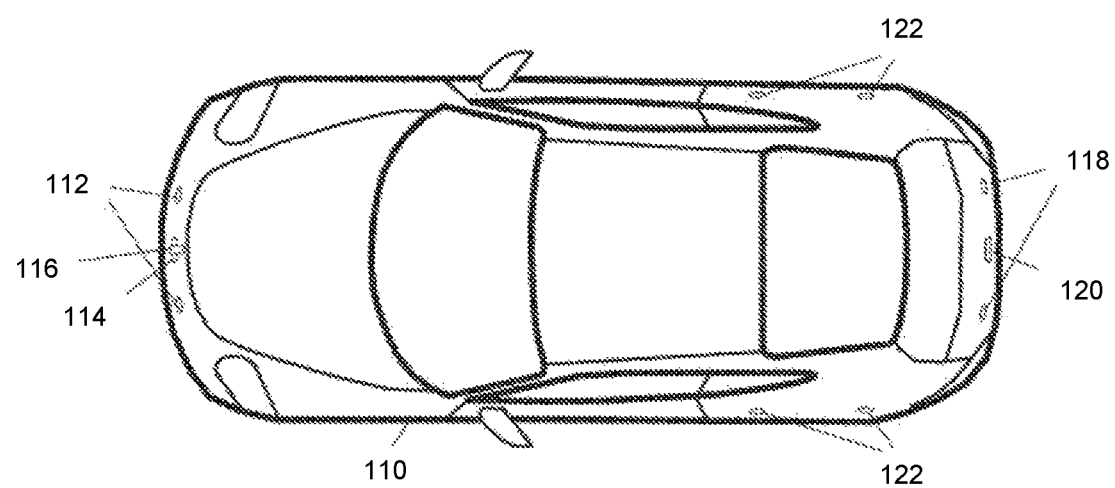
FIG. 1 is a drawing illustrating an example of a vehicle equipped with radar sensors according to some embodiments of the present disclosure.

An integrated circuit that communicates encoded signals is described. This integrated circuit may include K transmit circuits that output K transmit signals, where K is a non-zero integer and the K transmit signals are encoded using first Doppler code multiplexing. Moreover, the integrated circuit may include L receive circuits that provide L receive signals (which may correspond to the K transmit signals), where L is a non-zero integer and the L receive signals are encoded using second Doppler code multiplexing. Note that the first and/or the second Doppler code multiplexing may be different from Doppler division multiplexing. Furthermore, the first Doppler code multiplexing may include selectively Doppler shifting a $k^{th}$ transmit signal in the K transmit signals by $n_k$ bins between chirps in a frame, and the second Doppler code multiplexing may include selectively Doppler shifting an $l^{th}$ receive signal in the L transmit signals by $n_l$ bins between the chirps in the frame. Additionally, the K transmit signals and/or the L receive signals may be encoded using a bipolar phase code, such as a Barker code or a nested Barker code.

By communicating the encoded signals, these circuit techniques may provide good waveform orthogonality between the K transmit circuits and/or the L receive circuits. Notably, a PSLR in a Doppler spectrum corresponding to the L receive signals may be greater than a predefined value, such as a predefined value associated with Doppler division multiplexing. Moreover, the circuit techniques may not impact the unambiguous velocity or the maximum range of radial velocity that can be measured by the integrated circuit. Consequently, the circuit techniques may enable the use of MIMO and may improve the performance of radar measurements performed using the integrated circuit.

In the discussion that follows, a vehicle may include: an automobile, a sports utility vehicle, a truck, a motorcycle, a train, an aircraft, a boat, or another type of transportation conveyance. However, in the discussion that follows, an automobile is used as an illustrative example of the vehicle.

Moreover, in the discussion that follows, a vehicle may use one or more types of sensors to perform measurements associated with objects in the surrounding environment. While a wide variety of types of sensors may be used, in the discussion that follows radar sensors are used as an illustrative example. The radar sensors may perform measurements using at least one of a variety of modes of operation (such as pulsed or continuous-wave), and may involve the use of one or more types of modulation (such as amplitude, frequency and/or phase modulation). In some embodiments, frequency-modulated continuous-wave (FMCW) radar is used. Furthermore, transmitted and received radar signals (e.g., having carrier frequencies in a radar band of frequencies, such as between 3 MHz and 100 GHz) may be generated and/or processed in the analog domain and/or the digital domain.

Figure 2:
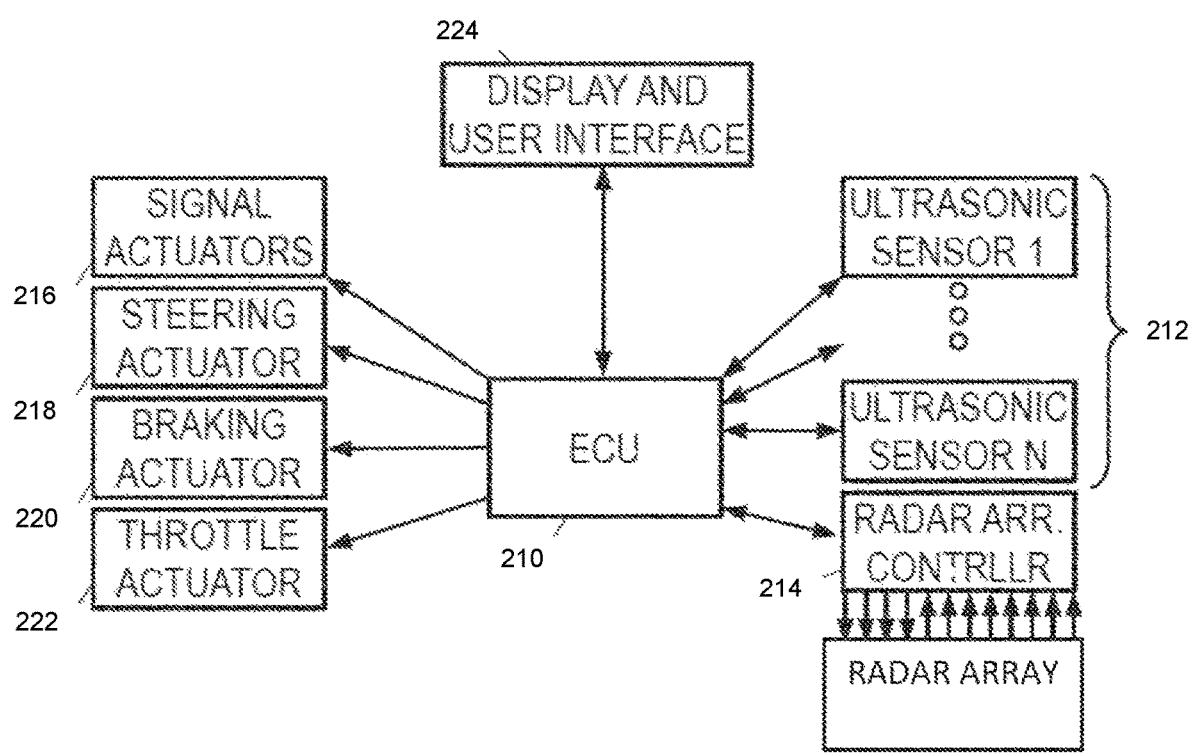
FIG. 2 is a block diagram illustrating an example of a driver-assistance system according to some embodiments of the present disclosure.

We now describe embodiments of the circuit techniques. FIG. 1 presents a drawing illustrating an example of a vehicle 110 equipped with an array of radar antennas, including: antennas 112 for short-range sensing (e.g., for parking assist), antennas 114 for mid-range sensing (e.g., for monitoring stop-and-go traffic and cut-in events), antennas 116 for long-range sensing (e.g., for adaptive cruise control and collision warning), each of which may be placed behind the front bumper cover. Antennas 118 for short-range sensing (e.g., for back-up assist) and antennas 120 for mid-range sensing (e.g., for rear-collision warning) may be placed behind the back-bumper cover. Moreover, antennas 122 for short-range sensing (e.g., for blind-spot monitoring and side-obstacle detection) may be placed behind the car fenders. Each antenna and each set of antennas may be grouped in one or more arrays. Furthermore, each array may be controlled by a radar-array controller 205 (FIG. 2). In some embodiments, a given set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles. While the preceding discussion illustrates vehicle 110 with radar sensors, in other embodiments vehicle 110 may include additional types of sensors, such as LiDAR, an ultrasonic sensor, a camera, etc.

FIG. 2 presents a block diagram illustrating an example of a driver-assistance system. This driver assistance system may include an electronic control unit (ECU) 210 coupled to various sensors 212 and radar-array controller 214 as the center of a star topology. However, other topologies may include serial, parallel, and hierarchical (tree) topologies. Radar-array controller 214 may couple to the transmit and receive antennas (e.g., in antennas 114) to transmit electromagnetic waves, receive reflections, and determine a spatial relationship of the vehicle to its surroundings. Moreover, radar-array controller 214 may couple to carrier-signal generators. In some embodiments, radar-array controller 214 may control the timing and order of actuation of a plurality of carrier signal generators.

In order to provide automated parking assistance, ECU 210 may couple to a set of actuators, such as: a turn-signal actuator 216, a steering actuator 218, a braking actuator 220 and/or a throttle actuator 222. Moreover, ECU 210 may couple to an interactive user interface 224 to accept user input and to display various measurements and system status.

Using user interface 224, sensors, and actuators, ECU 210 may provide: automated parking, assisted parking, lane-change assistance, obstacle and blind-spot detection, autonomous driving and/or other desirable features. During operation of vehicle 110 (FIG. 1), sensor measurements may be acquired by ECU 210, and may be used by ECU 210 to determine a status of vehicle 110. Moreover, ECU 210 may act on the status and incoming information to actuate signaling and control transducers to adjust and maintain operation of vehicle 110. For example, the operations that may be provided by ECU 210 include driver-assist features, such as: automatic parking, lane following, automatic braking, self-driving, etc.

Furthermore, in order to obtain the measurements, ECU 210 may employ a MIMO radar system. Radar systems operate by emitting electromagnetic waves that travel outward from a transmit antenna before being reflected towards a receive antenna. The reflector may be any moderately reflective object in the path of the emitted electromagnetic waves. By measuring the travel time of the electromagnetic waves from the transmit antenna to the reflector and back to the receive antenna, the radar system may determine the distance to the reflector. Additionally, by measuring a Doppler shift of the electromagnetic waves, the radar system may determine a velocity of the reflector relative to vehicle 110 (FIG. 1). When multiple transmit or receive antennas are used, or when multiple measurements are made at different positions, the radar system may determine the direction to the reflector and, thus, may track the location of the reflector relative to vehicle 110 (FIG. 1). With more sophisticated processing, multiple reflectors may be tracked. In some embodiments, the radar system may employ array processing to 'scan' a directional beam of electromagnetic waves and to construct an image of the surroundings of environment around vehicle 110 (FIG. 1). In general, pulsed and/or continuous-wave implementations of the radar system may be implemented.

Figure 3:
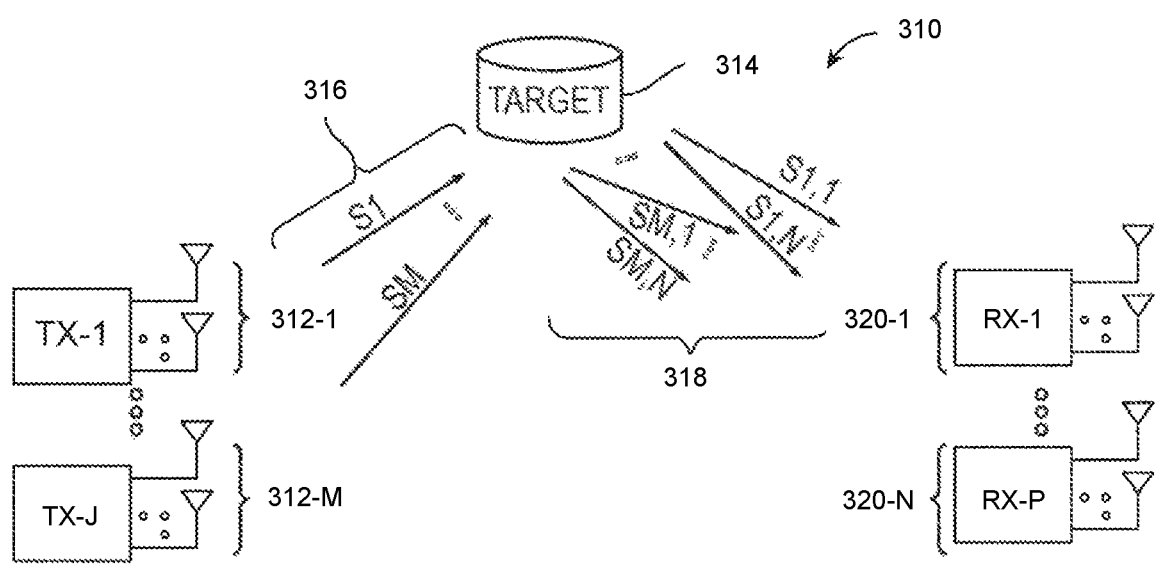
FIG. 3 is a block diagram illustrating an example of a radar system according to some embodiments of the present disclosure.

FIG. 3 presents a block diagram illustrating an example of a radar system 310 having a MIMO configuration, in which J transmitters are collectively coupled to M transmit antennas 312 to send transmit signals 316, where J and M are non-zero integers. The M possible transmit signals 316 may reflect from one or more reflectors or targets 314 to be received as receive signals 318 via N receive antennas 320 coupled to P receivers, where N and P are non-zero integers. Each receiver may extract the amplitude and phase or travel delay associated with each of the M transmit signals 316, thereby enabling the system to obtain N·M measurements (though only J·P of the measurements may be obtained concurrently). The processing requirements associated with each receiver extracting J measurements can be reduced via the use of time-division multiplexing and/or orthogonal coding. Moreover, the available antennas may be systematically multiplexed to the available transmitters and receivers to collect the full set of measurements for radar imaging.

Figure 4:
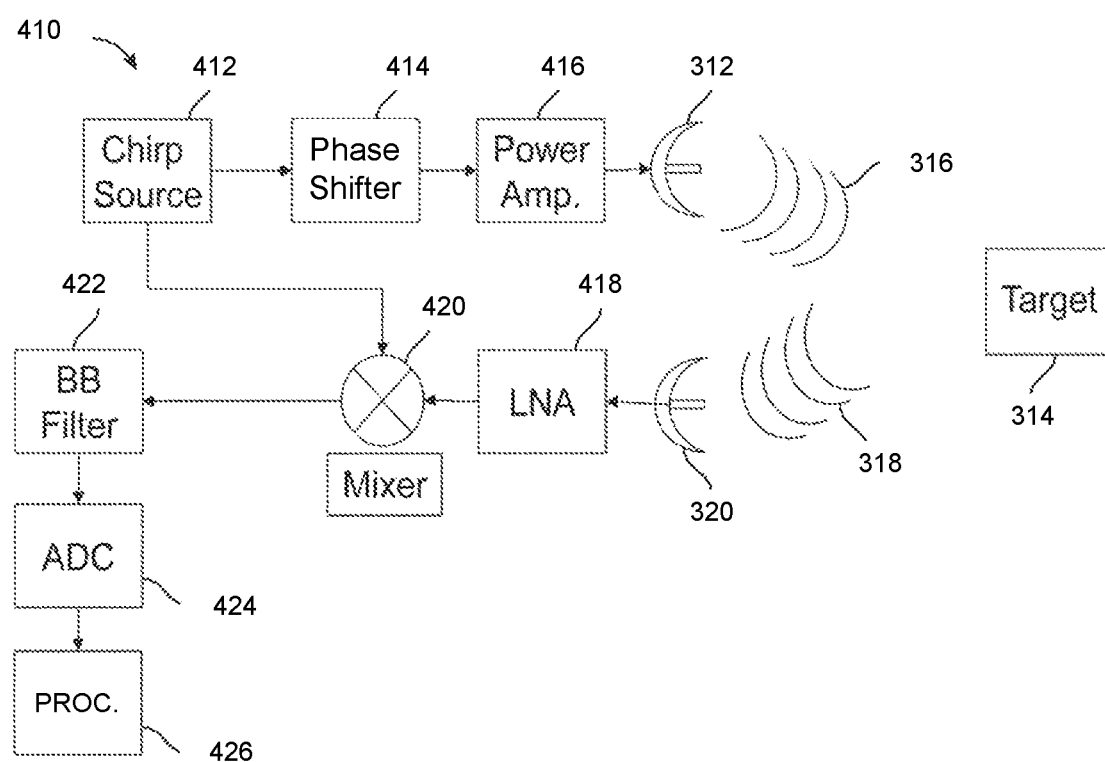
FIG. 4 is a block diagram illustrating an example of a radar system according to some embodiments of the present disclosure.

FIG. 4 presents a block diagram illustrating an example of a radar transceiver circuit 410 (e.g., in radar system 310 in FIG. 3). In some embodiments, radar transceiver circuit 410 is implemented as an integrated circuit in a packaged chip. Radar transceiver circuit 410 may include: a carrier-signal (chirp) generator 412, a phase shifter 414 (and, more generally, an encoder circuit, which may implement Doppler code multiplexing), an amplifier 416, and/or transmit antennas 312 which can transmit signals 316 based at least in part on the output of the carrier-signal generator 412. Moreover, radar transceiver circuit 410 may include: receiver antennas 320, a low-noise amplifier (LNA) 418, and/or a mixer 420 (which, in some embodiments, may implement Doppler code multiplexing). Mixer 420 may mix received signals 318 detected by receive antennas 312 with the signal from the carrier-signal generator 412. Furthermore, low-noise amplifier 418 may be used to amplify received signals 318 detected by receive antennas 320. In some embodiments, radar transceiver circuit 410 may include: a sensitivity time controller and equalizer (not shown), a broadband (BB) filter 422, an analog-to-digital converter (ADC) 424 and/or a processor 426 (e.g., ECU 210 and/or radar-array controller 214 in FIG. 2), which may perform further processing of the received signals (such as a Fourier transform). In some embodiments, processor 426 and low-noise amplifier 418 may be coupled for bi-directional communication.

Additionally, in some embodiments, carrier-signal generator 412 may be coupled to radar array-controller 214 (FIG. 2). Carrier-signal generator 412 may include a chirp generator to create an FMCW signal. The chip rate of carrier-signal generator 412 may be controlled by radar-array controller 214 (FIG. 2). In some embodiments, carrier-signal generator 412 may be deactivated by radar-array controller 214 (FIG. 2) to provide an unmodulated carrier signal. Moreover, carrier-signal generator 412 may be implemented as a local oscillation (LO) signal generator, a fractional-N phase lock loop (PLL) with a 24 controller, or as a direct-digital synthesis generator.

Furthermore, carrier-signal generator 412 may be coupled to transmit antennas 312 through phase shifter 414 and amplifier 416. Carrier-signal generator 412 may be coupled to receiving antennas 312 through mixer 420 and low-noise amplifier 418. Additionally, carrier-signal generator 412 may generate a transmit signal (e.g., a chirp signal). Amplifier 416 may receive the transmit signal from carrier-signal generator 412 and transmit signals 316 corresponding to the transmit signal from carrier-signal generator 412 may be transmitted using transmit antennas 312.

In some embodiments, a radar transmitter may include: a phase rotator, a bi-phase modulator, a variable gain amplifier, a switch, a power amplifier driver, a power amplifier, and/or a digital signal processor (DSP). Moreover, in some embodiments, a radar transmitter may include a digital controller. This digital controller may be included in the DSP or may be a separate component. Furthermore, the phase rotator may be used for digital phase modulation. Additionally, the radar transmitter may use a wave-modulated power amplifier in a digital-envelope modulation technique.

In order to obtain good spatial and angular resolution for range and detection, many radar systems use phased arrays. However, because of expense and power-consumption constraints, the number of elements in a phased array may be limited.

The limitations are typically addressed in a variety of ways. For example, digital beamforming in a receive circuit may be used to superimpose different phases to allow viewing in multiple directions simultaneously. Alternatively or additionally, in a virtual transmit array, when transmit signals from multiple transmit circuits are orthogonal to each other, the size of the transmit array is effectively increased.

Moreover, in some radar system architectures, a intermediate frequency chain and analog-to-digital converter (ADC) (which may occupy a large amount of area on an integrated circuit or die) may be shared with multiple radio-frequency frontends (which each may include a low-noise amplifier and a mixer electrically coupled to an antenna). This approach may reduce cost and improve resolution. In some embodiments, time domain multiplexing (TDM) may be used to switch the radio-frequency frontends on and off. Alternatively or additionally, modulators (such as phase shifters) may be used to modulate transmit signals and demodulate receive signals, so they can be processed concurrently without interference.

Furthermore, it can be difficult to phase modulate radar transmitters (such as transmit circuits) and/or receivers (such as receive circuits) without adversely impacting FMCW signals (which may adversely impact time-of-flight measurements and, thus, measured range). In FMCW, a sequence of predefined chirps (which a predefined change in frequency as a function of time) are applied to the transmit signals. The corresponding receive signals may be stored in an array. Notably, there may be 512 samples per row or chirp in the array. Moreover, a column in the array may include an instance of a sample from each of the chirps, which may provide phase or Doppler information. Note that a two-dimensional fast Fourier transform (FFT) along different dimensions of the array may provide the range, the Doppler or velocity, or angular information.

As noted previously, modulation of the transmit signals may be implemented using phase shifters (such as phase coding). This may result in a modulation of the phase of each chirp and a Doppler shift over multiple chirps. Notably, by measuring how the phase pattern repeats over M chirps, the Doppler shift may be determined. Thus, while the phase coding may improve the angular resolution, there may be a cost in the velocity resolution.

Consequently, because it can be difficult to achieve orthogonality between radar transmitters and/or receivers, it is often assumed that orthogonality between radar transmitters and/or receivers may be achieved by TDM and/or Doppler division multiplexing. However, both of these approaches may adversely impact the unambiguous velocity.

In the disclosed circuit techniques, a matched filter-based Doppler code multiplexing technique that does not impact the unambiguous velocity is described. This Doppler code multiplexing technique may be used in a MIMO radar. Moreover, the Doppler code multiplexing technique may provide very good waveform orthogonality, even when it is applied to the transmit array and the receive array. However, the Doppler code multiplexing technique may incur a cost of increased complexity, because it may be necessary to identify and reduce or eliminate matched-filter sidelobes, which may appear as ghost targets in a Doppler spectrum.

FIGS. 5A-5D present drawings illustrating an example of a comparison of magnitudes of transfer functions for matched filters and corresponding ambiguity functions associated with Doppler division multiplexing and Doppler code multiplexing according to some embodiments of the present disclosure. While the Doppler code multiplexing may be applied in the transmit array and/or the receive frontend array, in the following discussion its use in a K-element transmit array is used as an illustration. Notably, the waveform transmitted by the $k^{th}$ transmit circuit in the transmit array may be Doppler-shifted by $n_{T,k}$ bins, such that reflections of a single target for K transmit circuits may form a low-ambiguity pattern in the Doppler spectrum, thereby allowing improved or optimal estimation of the target velocity by matched filtering (cross-correlation) in the Doppler domain on reception. Note that Doppler code multiplexing is not the same as Doppler division multiplexing. Instead, it is a Doppler code division technique. Doppler division multiplexing may be viewed as a special case of Doppler code multiplexing. Because the Doppler code multiplexing does not dividing the Doppler spectrum into N sections (as is the case in Doppler division multiplexing), velocity resolution may not be adversely impacted.

Figure 5A:
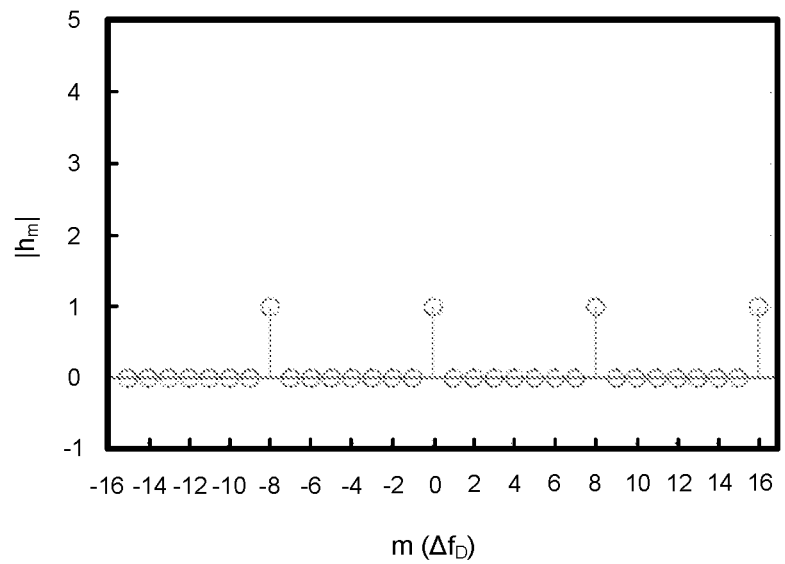
FIGS. 5A-5D are drawings illustrating an example of a comparison of magnitudes of transfer functions for matched filters and corresponding ambiguity functions associated with Doppler division multiplexing and Doppler code multiplexing according to some embodiments of the present disclosure.
Figure 5B:
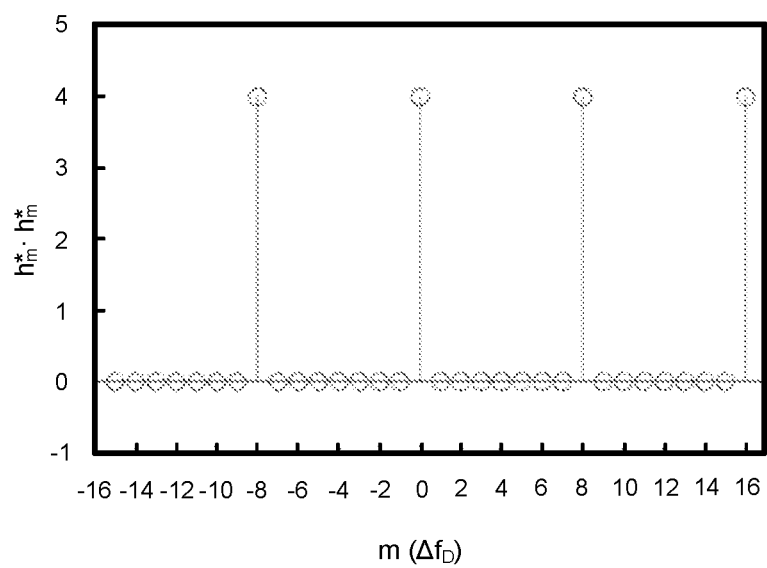

FIG. 5A presents a magnitude of a transfer function for a matched filter for Doppler division multiplexing with $n_T=\{0, 8, 16, 24\}$. Moreover, FIG. 5B presents the corresponding ambiguity function. Note that the PSLR is 4/4 or 0 dB and the integrated sidelobe ratio (ISLR) is 4/12 or −9.5 dB.

Figure 5C:
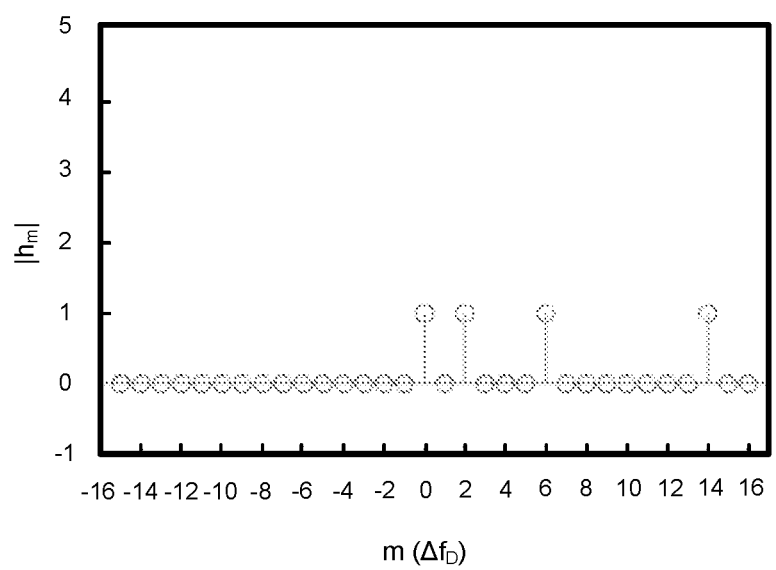
Figure 5D:
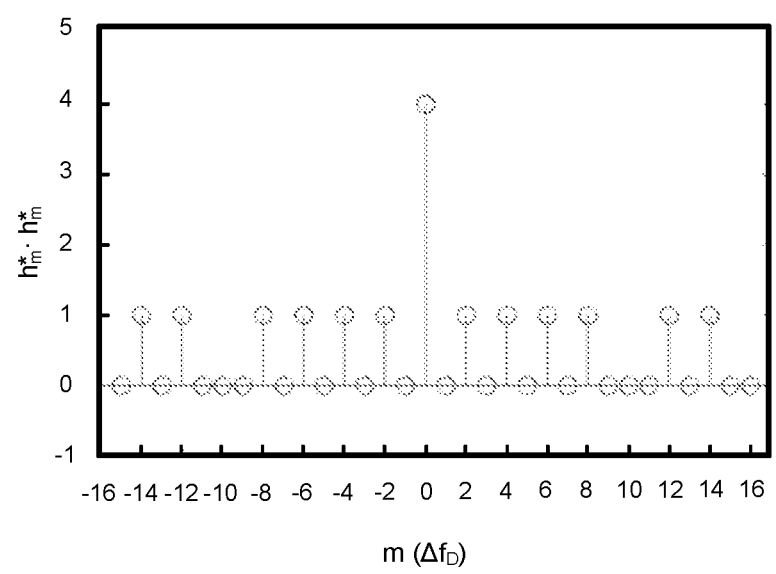

Furthermore, FIG. 5C presents a magnitude of a transfer function for a matched filter for Doppler code multiplexing with $n_T=\{0, 2, 6, 14\}$. Moreover, FIG. 5D presents the corresponding ambiguity function. Note that the PSLR is 4/1 or 12 dB and the ISLR is 4/12 or −9.5 dB. In Doppler code multiplexing, the main beam may be at a velocity of zero with sidelobes.

During or in the Doppler code multiplexing, a constant phase shift of $\Delta_{\varphi k}$ may be applied between the chirps of the $k^{th}$ transmit circuit in order to apply the Doppler shift of $n_{T,k}$ bits $$\Delta \varphi_k = -2\pi \cdot \frac{n_{T,k}}{M},$$

where $\Delta_{\varphi k}$ is a phase step and M is a number of chirps per frame. In order to minimize the Doppler ambiguity, the differences between the elements in $n_T$ may need to be unique or non-recurring $$n_{T,i} - n_{T,j} \neq n_{T,i} - n_{T,k},$$

where i, j, k is an element of [1, K], i≠j≠k.

The Doppler-domain matched filter may be the non-sparse zero-padded M-element vector representation of $n_T$ $$h_m = [0 \ldots n_{T,0} 0 \ldots n_{T,1} 0 \ldots n_{T,K-1} \ldots 0].$$

Moreover, convolution with the matched filter may be interpreted as cross-correlation of the received signal (the Doppler spectrum) with the transmitted signal $f_m$ $$S_{D,filt} = h_m^* \cdot S_D.$$

Figure 6:
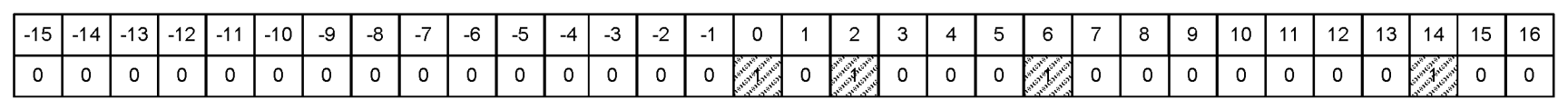

For example, if a 32-bit spectrum is assumed, the matched filter for $n_T$={0, 2, 6, 14} is shown in FIG. 6, which presents a drawing illustrating an example of a matched filter corresponding to Doppler code multiplexing in a transmit circuit according to some embodiments of the present disclosure. Furthermore, the matched filter operation may be as expressed as $$S_{D,filt}(i_D) = \sum_{k=1}^{K} S_D(i_D + n_{T,k}),$$

where $S_{D,filt}$ is the filtered Doppler spectrum, $i^D$ is the bin index and $S_D$ is the raw Doppler spectrum.

Furthermore, Barker codes are a class of pulse compression codes that can be used to improve waveform autocorrelation and ambiguity. Notably, Barker codes are bipolar phase codes in which a pulse is multiplied by +1 or −1 (or an alternating phase between 0° and 180°). Note that the PSLR of a Barker code of length N is dB(N).

Figure 7A:
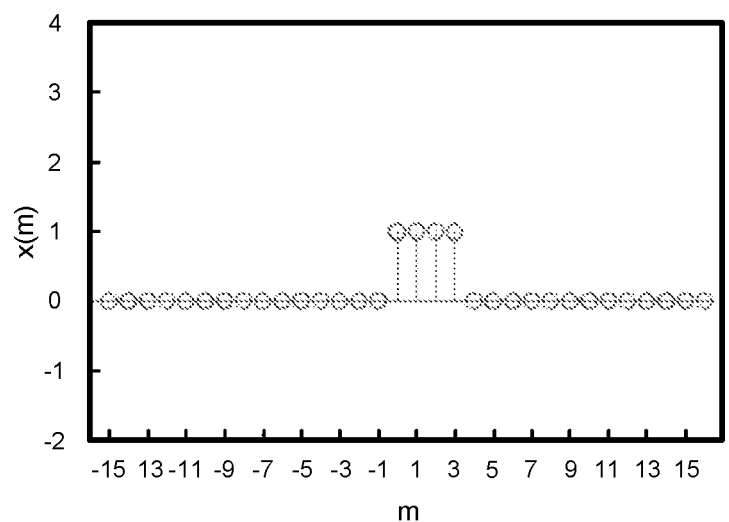
FIGS. 7A-7D are drawings illustrating an example of a comparison of pulses and autocorrelations of a pulse and of a pulse encoded using a Barker code according to some embodiments of the present disclosure.
Figure 7B:
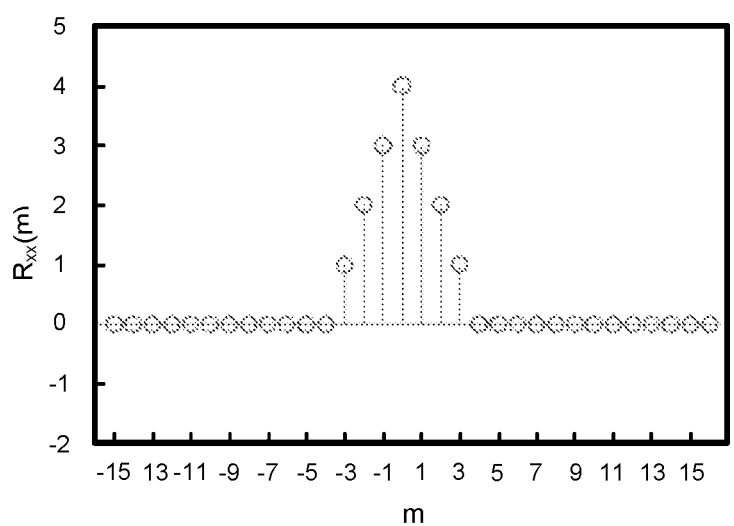
Figure 7C:
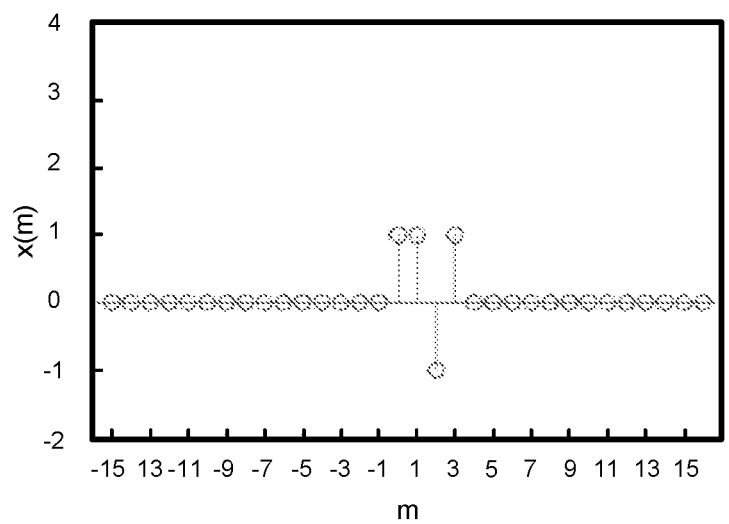
Figure 7D:
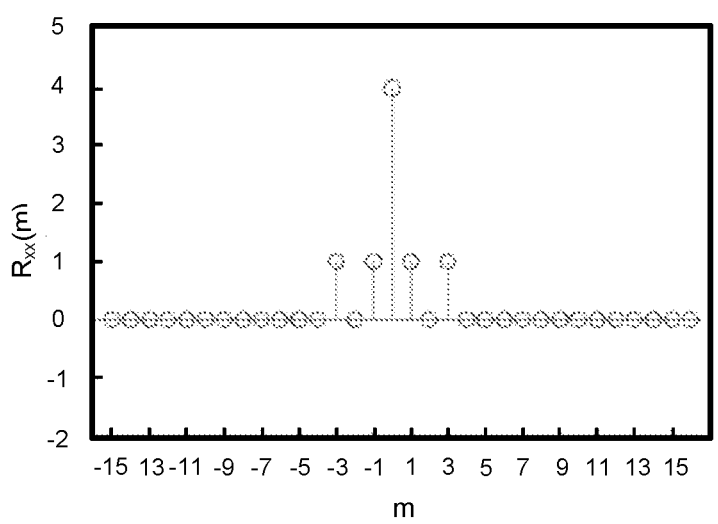

FIGS. 7A-7D presents drawings illustrating an example of a comparison of pulses and autocorrelations of a pulse and of a pulse encoded using a Barker code according to some embodiments of the present disclosure. Notably, FIG. 7A shows a 4-bin long pulse and FIG. 7B shows the associated autocorrelation. The PSLR is ⅓ or 2.5 dB and the ISLR is 12/4 or −9.5 dB. Moreover, FIG. 7C shows a Barker-coded pulses $B_4$=[0 0π0] and FIG. 7D the associated autocorrelation. The PSLR is 4/1 or 12 dB and the ISLR is 4/4 or 0 dB.

However, there are only nine known Barker codes of lengths 2, 3, 4, 5, 7, 11 and 13. These Barker codes are summarized in Table 1.

TABLE 1

| Code Length | Code | PLSR (dB) |
| --- | --- | --- |
| 2 | + −, + + | −6.0 |
| 3 | + + − | −9.5 |
| 4 | + + − +, + + + − | −12.0 |
| 5 | + + + − + | −14.0 |
| 7 | + + + − − + − | −16.9 |
| 11 | + + + − − − + − − + − | −20.8 |
| 13 | + + + + + − − + + − + − + | −22.3 |

It is possible to generate nested Barker codes of other lengths by applying the Kronecker product to a pair of optimal Barker codes. For example, $$B_{23} = B_2 \otimes B_3 = \begin{bmatrix} + & - \\ + & - \\ - & + \end{bmatrix}$$

or $$B_{44} = B_4 \otimes B_4 = \begin{bmatrix} + & + & - & + \\ + & + & - & + \\ - & - & + & - \\ + & + & - & + \end{bmatrix}.$$

Note that nested Barker codes are suboptimal (they have a PSLR of less than N/1). In some embodiments, Barker codes and/or nested Barker codes may be used in the circuit techniques.

Figure 8:
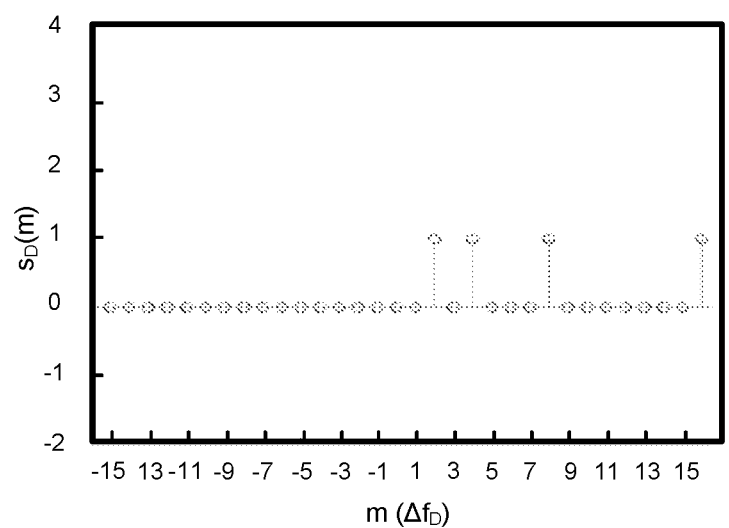
FIG. 8 is a drawing illustrating an example of a Doppler spectrum for receive signals corresponding to transmit signals reflected off of a slow target according to some embodiments of the present disclosure.

We now consider examples of Doppler code multiplexing in K transmit circuits. In an example without Doppler code multiplexing, K may be four, $n_T$ may be {0, 2, 6, 14}, $\Delta n_T$ may be {2, 4, 8, 18} (which is unique), M may be 32 chirps ($f_{D,max}$ may be in bin+16), and there may be a single slow target ($f_{fX}$ may be in bin+2). The resulting Doppler spectrum is shown in FIG. 8, which presents a drawing illustrating an example of a Doppler spectrum for receive signals corresponding to transmit signals reflected off of a slow target according to some embodiments of the present disclosure. Note that the target may appear in four bins. The correct Doppler shift may be in $f_D(1)=(2+0)\cdot f_{D,res}<f_{D,max}$. In addition, there may be three ghosts: $f_D(2)=(2+2)\cdot f_{D,res}<f_{D,max}$; $f_D(3)=(2+6)\cdot f_{D,res}<f_{D,max}$; and $f_D(4)=(2+14)\cdot f_{D,res}<f_{D,max}$.

Figure 9:
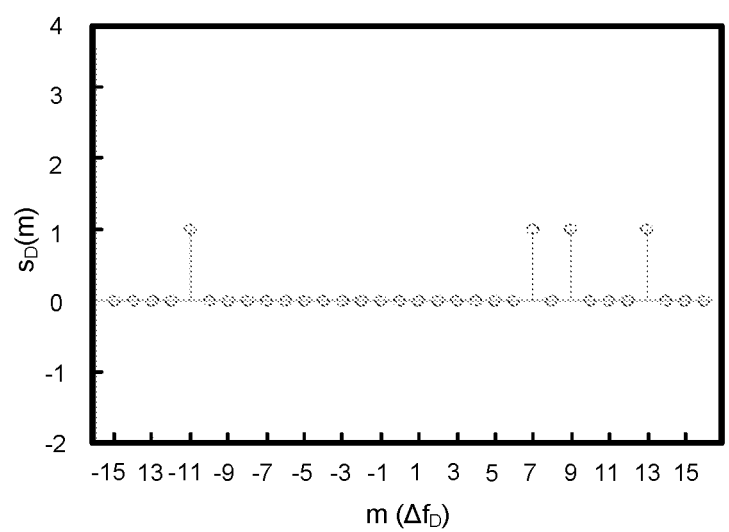
FIG. 9 is a drawing illustrating an example of a Doppler spectrum for receive signals corresponding to transmit signals reflected off of a fast target according to some embodiments of the present disclosure.

In a second example without Doppler code multiplexing, K may be four, $n_T$ may be {0, 2, 6, 14}, And may be {2, 4, 8, 18} (which is unique), M may be 32 chirps ($f_{D,max}$ may be in bin+16), and there may be a single fast target ($f_{fX}$ may be in bin+7). The resulting Doppler spectrum is shown in FIG. 9, which presents a drawing illustrating an example of a Doppler spectrum for receive signals corresponding to transmit signals reflected off of a fast target according to some embodiments of the present disclosure. Note that the target may appear in four bins. The correct Doppler shift may be in fb(1)=(7+0)·$f_{D,res}<f_{D,max}$. In addition, there may be three ghosts. Notably, there may be two unfolded ghosts: fb(2)=(7+2)·$f_{D,res}<f_{D,max}$; and fb(3)=(7+6)·$f_{D,res}<f_{D,max}$. Moreover, there may be a folded ghost: $f_D(4)=(7+14)\cdot f_{D,res}<f_{D,max}$. In general, aliasing may not be a problem.

Figure 10:
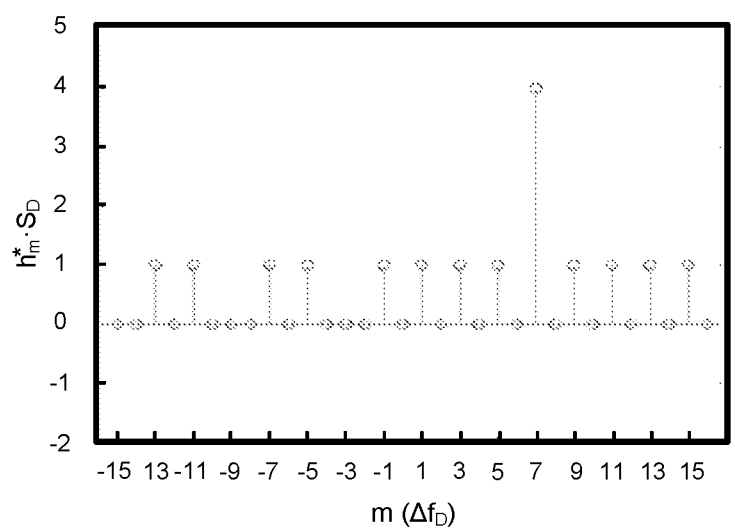
FIG. 10 is a drawing illustrating an example of a Doppler spectrum for receive signals corresponding to transmit signals reflected off of a fast target and encoded using Doppler code multiplexing according to some embodiments of the present disclosure.

In a third example with Doppler code multiplexing, K may be four, $n_T$ may be {0, 2, 6, 14}, And may be {2, 4, 8, 18} (which is unique), M may be 32 chirps ($f_{D,max}$ may be in bin+16), and there may be a single fast target (fDo may be in bin+7). The resulting Doppler spectrum is shown in FIG. 10, which presents a drawing illustrating an example of a Doppler spectrum for receive signals corresponding to transmit signals reflected off of a fast target and encoded using Doppler code multiplexing according to some embodiments of the present disclosure. Note that the real target bin signal level is now 12 dB higher than the sidelobes.

Figure 11A:
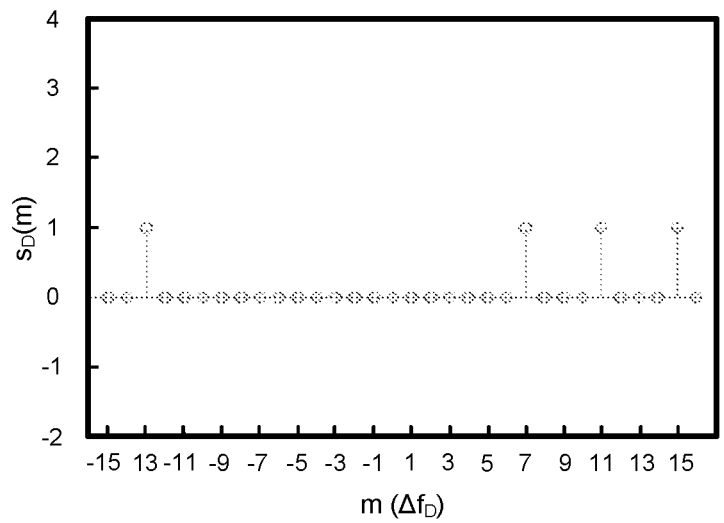
FIGS. 11A-11B are drawings illustrating an example of a comparison of a Doppler spectrum for receive signals corresponding to transmit signals reflected off of a fast target and a Doppler spectrum for receive signals corresponding to transmit signals reflected off of a fast target and encoded using Doppler code multiplexing according to some embodiments of the present disclosure.
Figure 11B:
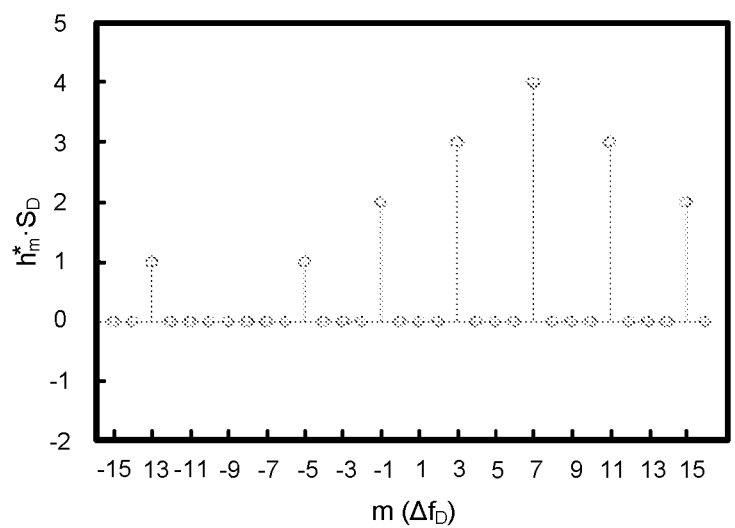

In a fourth example without and with Doppler code multiplexing, K may be four, $n_T$ may be {0, 2, 6, 14}, And may be {4, 4, 4} (which is not unique), M may be 32 chirps ($f_{D,max}$ may be in bin+16), and there may be a single fast target (fDo may be in bin+7). The resulting Doppler spectrums are shown in FIGS. 11A-11B, which present drawings illustrating an example of a comparison of a Doppler spectrum for receive signals corresponding to transmit signals reflected off of a fast target and a Doppler spectrum for receive signals corresponding to transmit signals reflected off of a fast target and encoded using Doppler code multiplexing according to some embodiments of the present disclosure. Note that when Doppler code multiplexing is used in this example, the PSLR is ⅖ or 2.5 dB, which is less than 12 dB.

Figure 12:
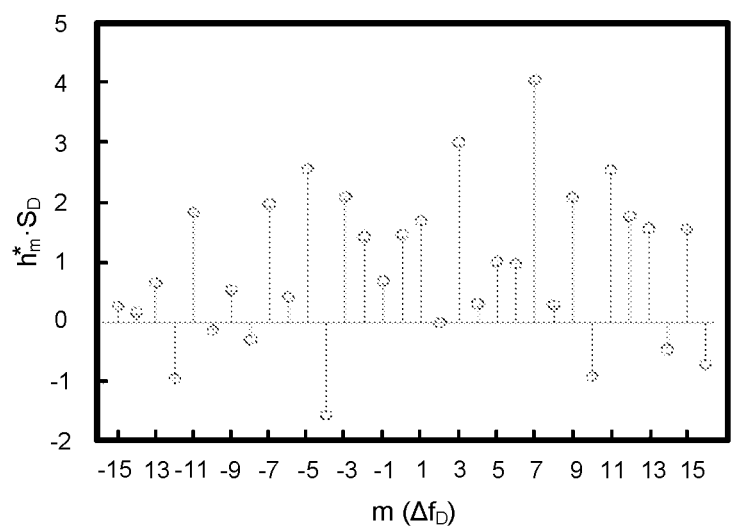
FIG. 12 is a drawing illustrating an example of a Doppler spectrum corresponding to noisy transmit signals reflected off of a target and encoded using Doppler code multiplexing according to some embodiments of the present disclosure.
Figure 13:
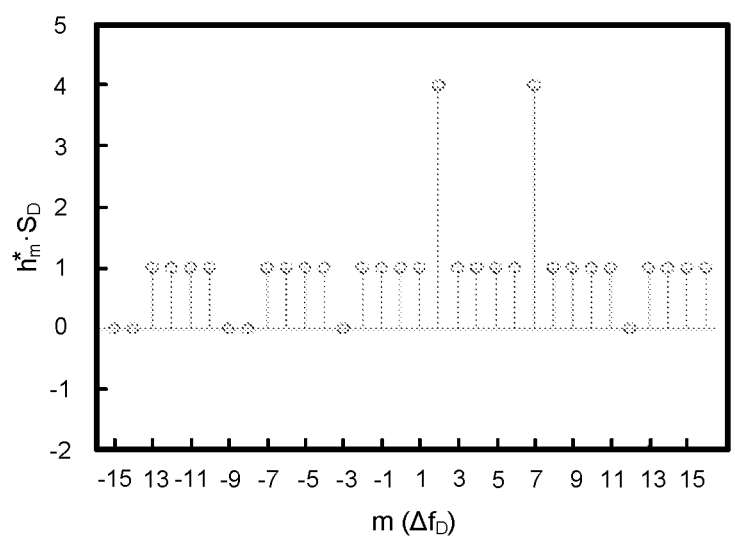
FIG. 13 is a drawing illustrating an example of a Doppler spectrum corresponding to transmit signals reflected off of multiple targets and encoded using Doppler code multiplexing according to some embodiments of the present disclosure.

However, the Doppler map after correlation may appear more complicated in real-world scenarios that include noise and multiple targets. This is illustrated in FIGS. 12 and 13. Notably, FIG. 12 presents a drawing illustrating an example of a Doppler spectrum corresponding to noisy transmit signals reflected off of a single target and encoded using Doppler code multiplexing according to some embodiments of the present disclosure. Moreover, FIG. 13 presents a drawing illustrating an example of a of Doppler spectrum corresponding to transmit signals reflected off of multiple targets (including a slow target and a fast target) and encoded using Doppler code multiplexing according to some embodiments of the present disclosure.

As shown in the preceding examples, distinguishing a real target from sidelobes may be difficult in some real scenarios. In some embodiments, this may be addressed using one or more techniques (e.g., in or after the L receive circuits) to reduce sidelobes in order to improve the probability of correct target velocity estimation. For example, in some embodiments the circuit techniques may include recursive coherent sidelobe elimination. In recursive coherent sidelobe elimination, a strongest current peak in the spectrum may be identified: $P_0$=maximum($|S_{filt}|$). Then, the expected (complex) sidelobes associated with the identified strongest current peak may be subtracted from a remainder of the spectrum. Next, these operations may be repeated M−1 times. However, note that when the noise floor is sufficiently high, then a noise peak may be mistaken for a target, which may corrupt the spectrum at its (non-existing) sidelobes.

Alternatively or additionally, in some embodiments non-coherent sidelobe elimination may be used. Notably, the bins containing the sidelobes associated with the $i^{th}$ bin in the filtered Doppler spectrum $S_{D,filt}(i_D)$) may be compared to a threshold level $$S_{th} = \alpha N_{ch} \cdot \max(|S_{D,filt}(i_D)|),$$

where $N_{ch}$ is the number of channels (e.g., $N_{ch}$ may equal K when there are K transmit circuits). Moreover, the constant $\alpha$ may be a multiplier that relaxes the decision threshold at low signal-to-noise scenarios to reduce the false alarm rate (at the cost of a higher misdetection rate). Note that when $|S_{D,filt}(i_D)|<Sth$ then $S_{D,filt}(i_D)=(1+i)\cdot\varphi_N/2$, where ox is the mean noise in the Doppler spectrum. The reason for setting $S_{D,filt}(I_D)$ to ox instead of zero may be to avoid corrupting the noise statistics as much as possible before a constant false alarm rate (CFAR) technique is performed.

In some embodiments $\alpha$ may be 0.9 or $$1 - \frac{1}{2N_{ch}}.$$

Furthermore, in some embodiments, the threshold level may be $\alpha \cdot N_{ch} \cdot FS$, where FS is the ADC full-scale (maximum) value. For example, with $\alpha$ equal to 0.9 and $N_{ch}$ equal to four, the threshold level may equal 3.6·FS. Note that the ADC full-scale value for a 12-bit ADC may be $2^{12}-1$ or 4,095. Additionally, in some embodiments, the threshold value may be −80 dBFS (decibels relative to the full-scale value).

In some embodiments, inter-frame processing may be used to reduce or eliminate sidelobes. Notably, the location of the sidelobes may be changed between frames by changing $n_T$, thereby facilitating the sidelobe identification and subsequent reduction or elimination. However, inter-frame processing may be slow and may significantly increase the digital signal processing (DSP) architectural overhead.

Figure 14A:
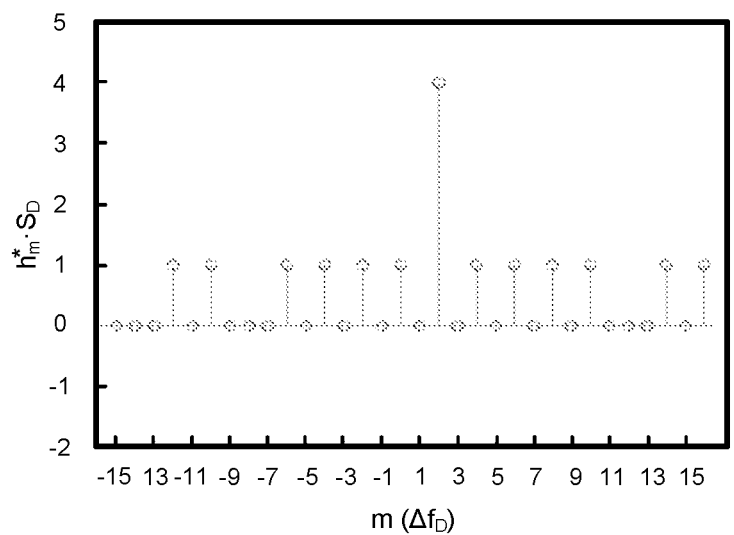
FIGS. 14A-14C are drawings illustrating an example of a comparison of two Doppler spectra for receive signals corresponding to transmit signals reflected off of a target and that are encoded using Doppler code multiplexing and a Doppler spectrum for receive signals corresponding to transmit signals reflected off of the target with sidelobe elimination and that is encoded using Doppler code multiplexing according to some embodiments of the present disclosure.
Figure 14B:
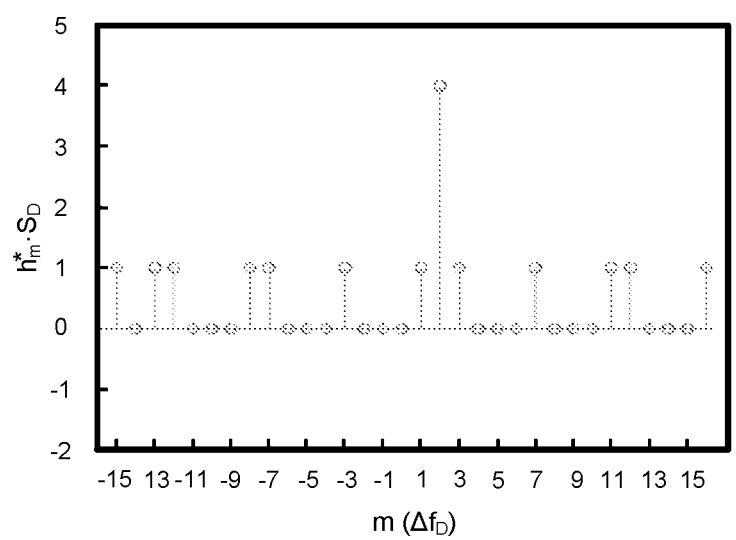
Figure 14C:
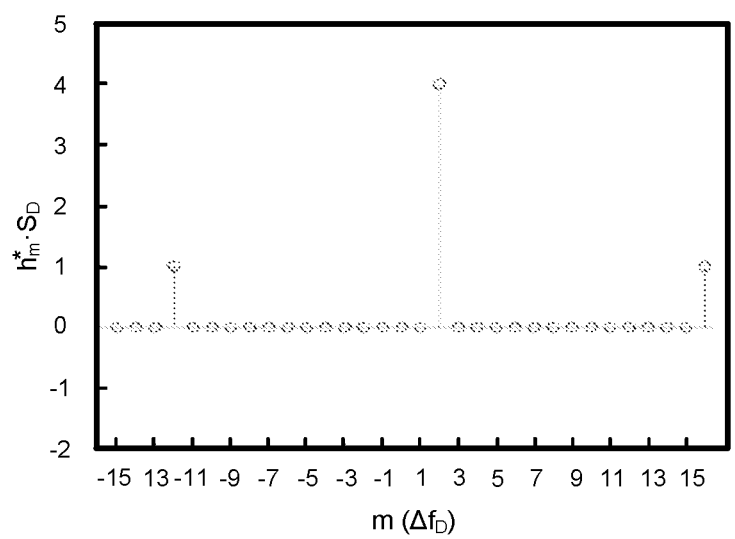

FIGS. 14A-14C present drawings illustrating an example of a comparison of two Doppler spectra for receive signals corresponding to transmit signals reflected off of a target and that are encoded using Doppler code multiplexing and a Doppler spectrum for receive signals corresponding to transmit signals reflected off of the target with sidelobe elimination and that is encoded using Doppler code multiplexing according to some embodiments of the present disclosure. Notably, FIG. 14A shows the Doppler spectra for receive signals corresponding to transmit signals reflected off of the target in frame 1 and that are encoded using Doppler code multiplexing with $n_T$={0, 2, 6, 14}. Moreover, FIG. 14B shows the Doppler spectra for receive signals corresponding to transmit signals reflected off of the target in frame 2 and that are encoded using Doppler code multiplexing with $n_T$={0, 1, 10, 15}. Furthermore, FIG. 14C shows the Doppler spectra for receive signals corresponding to transmit signals reflected off of the target with sidelobe elimination and that are encoded using Doppler code multiplexing.

In some embodiments of the circuit techniques, transmit and/or receive beamforming is used. Notably, in order to direct the transmit beam in the general angle θ, each element in the vector $n_T$ may be multiplied by a complex weight $$S_{D,filt}(i_D, \theta) = \sum_{k=1}^{K} S_D(i_D + n_{T,k}) \cdot \omega_k(\theta),$$

where $S_{D,filt}$ is the filtered Doppler spectrum, ($i_D$, θ) is the Doppler bin index, $n_{T,k}$ is the $k^{th}$ transmit Doppler shift and $\omega_k$ is a complex weight vector. Alternatively, this equation may be expressed in more compact form as $$S_{D,filt}(\theta) = h_m^* \cdot h_\omega^*(\theta) \cdot S_D,$$

where $h_\omega^*(\theta)$ may be a zero-padded representation of $\omega(\theta)$.

While the preceding discussion largely illustrated the circuit techniques with Doppler code multiplexing in the K transmit circuits (or in the transmitter), separately or additionally the circuit techniques may be implemented in the L receive circuits (or the receiver). Doppler code multiplexing in the receiver may be the same as that implemented in the transmitter. Alternatively, the transmitter may use a first Doppler code multiplexing that is different from a second Doppler code multiplexing that is used in the receiver. However, the principles of the Doppler code multiplexing in the receiver may be similar to those used in the transmitter. Notably, in order to shift a receive signal in the $l^{th}$ receive frontend (such as in a downconverter) by $n_{R,l}$ Doppler bins, a constant phase shift of $\Delta\varphi l$ may be applied between M chirps in a frame $$\Delta\varphi_l = -2\pi \cdot \frac{n_{R,l}}{M},$$

Similarly, in some embodiments, a beam in the receive angle $\theta$ may be formed as $$S_{D,filt}(i_D, \theta) = \sum_{l=1}^{L} S_D(i_D + n_{R,l}) \cdot \omega_l(\theta),$$

where $S_{D,filt}$ is the filtered Doppler spectrum, $(i_D, 0)$ is the Doppler bin index, $n_{R,l}$ is the $l^{th}$ receive Doppler shift and $\omega k$ is a complex weight vector.

Figure 15:
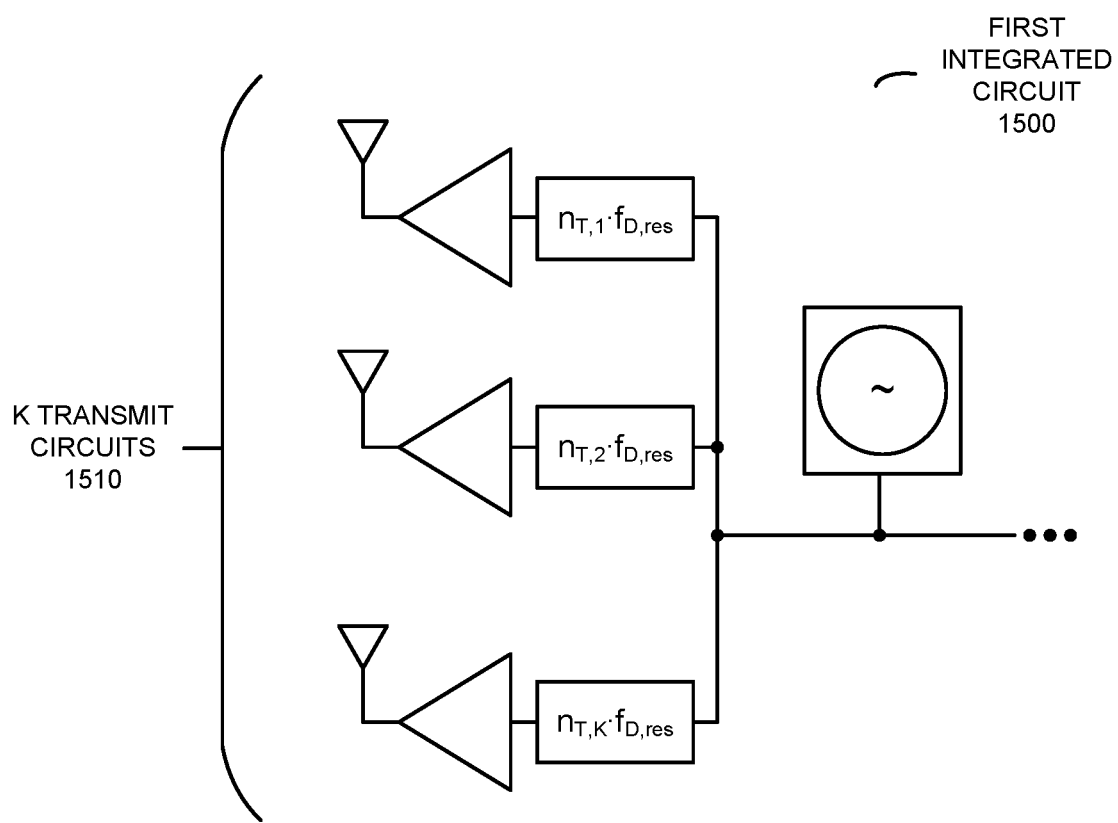
FIG. 15 is a block diagram illustrating an example of a first integrated circuit according to some embodiments of the present disclosure.

The circuit techniques may be implemented using one or more integrated circuits in a transmitter, a receiver or both. For example, FIG. 15 presents a block diagram illustrating an example of a first integrated circuit 1500 according to some embodiments of the present disclosure. This first integrated circuit may include K transmit circuits 1510 that implement at least a portion of the circuit techniques.

Figure 16:
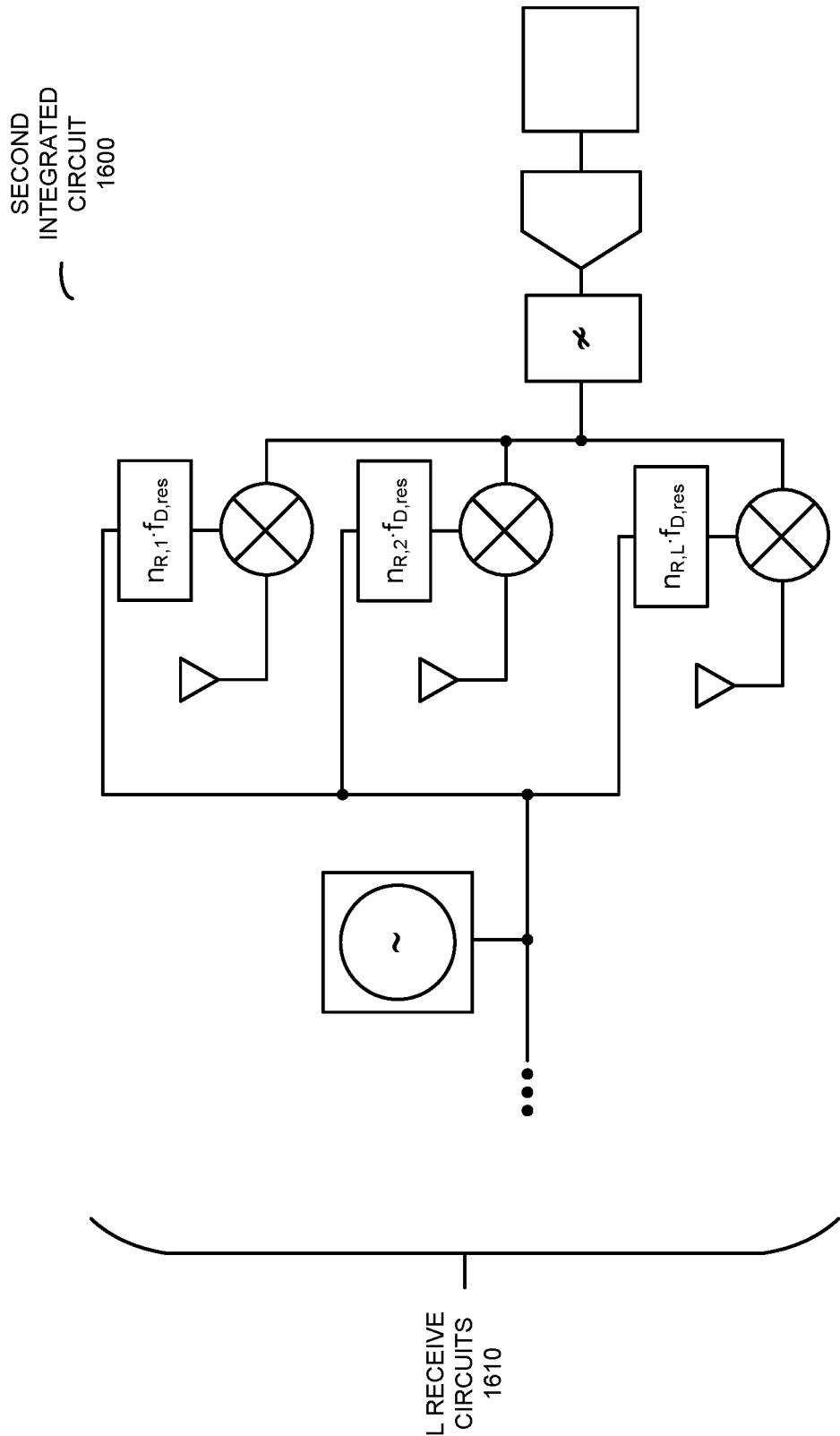
FIG. 16 is a block diagram illustrating an example of a second integrated circuit according to some embodiments of the present disclosure.

Moreover, FIG. 16 presents a block diagram illustrating an example of a second integrated circuit 1600 according to some embodiments of the present disclosure. This second integrated circuit may include L receive circuits 1610 that implement at least a portion of the circuit techniques.

Figure 17:
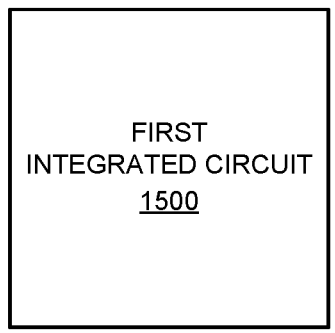
FIG. 17 is a block diagram illustrating an example of a system that includes a first integrated circuit and a second integrated circuit according to some embodiments of the present disclosure.
Figure 17:
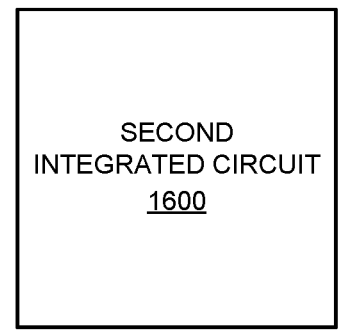

In some embodiments, the circuit techniques may be implemented on opposite sides of a link, e.g., in a system. This is shown in FIG. 17, which presents a block diagram illustrating an example of a system 1700 that includes first integrated circuit 1510 and second integrated circuit 1610 according to some embodiments of the present disclosure.

Figure 18:
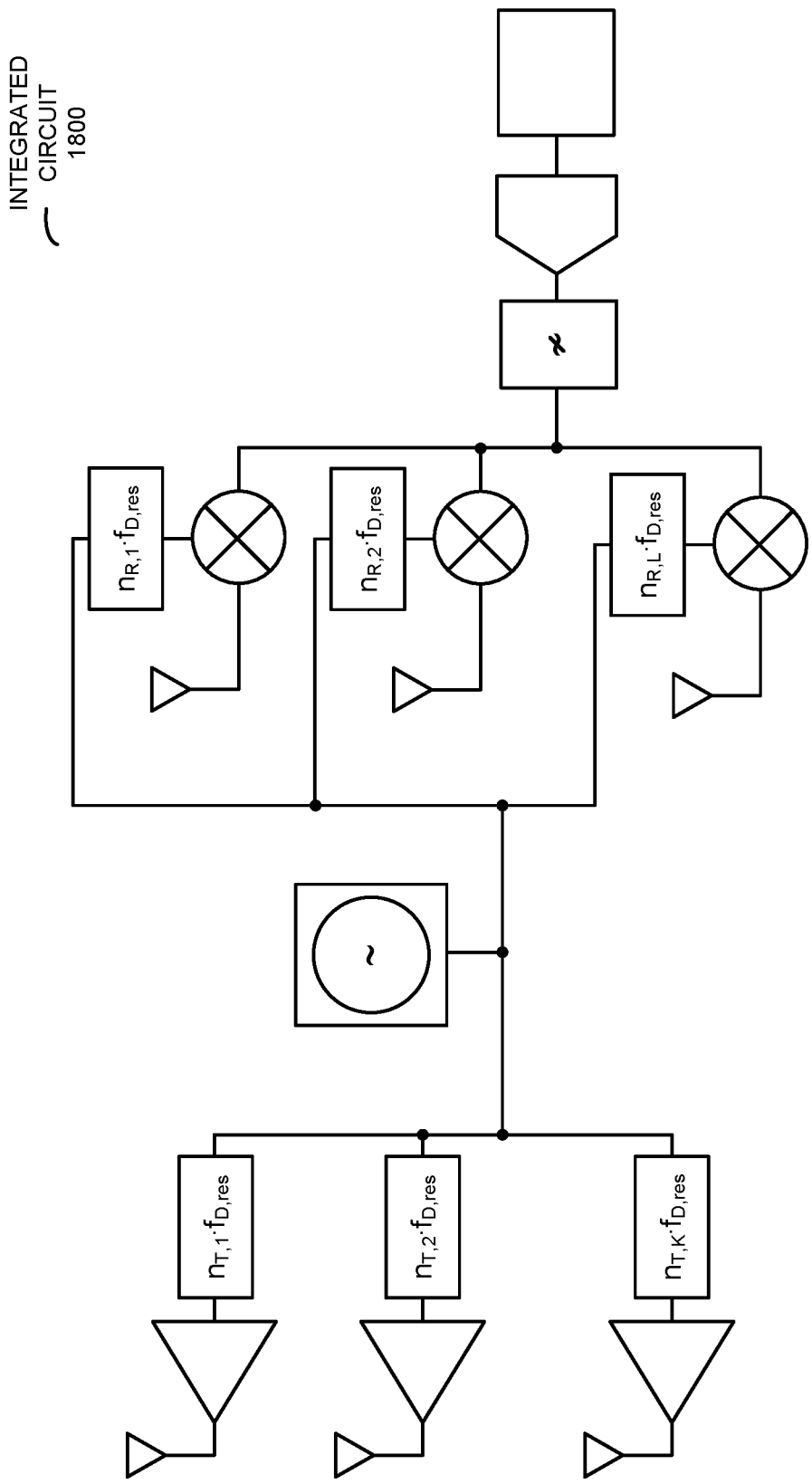
FIG. 18 is a block diagram illustrating an example of an integrated circuit according to some embodiments of the present disclosure.

Furthermore, in some embodiments, the circuit techniques for a transmitter and a receiver are implemented in an integrated circuit. This is shown in FIG. 18, which presents a block diagram illustrating an example of an integrated circuit 1800 according to some embodiments of the present disclosure. In the integrated circuit, the target reflection of the $k^{th}$ transit circuit waveform received by the $l^{th}$ frontend receive circuit may be Doppler shifted by K·L times according to the nested code $n_{k,l}=n_{T,k}+n_{R,l}$. Consequently, $$\Delta f_D(k, l) = (n_{T,k} + n_{R,l}) \cdot f_{D,res} = n_{k,l} \cdot f_{D,res}.$$

When nested transmit and received Doppler code multiplexing is used, the spatial-Doppler matched filter operation of the nested transmit and receive MIMO system may be expressed as $$S_{D,filt}(i_D, \theta) = \sum_{l=1}^{L}\sum_{k=1}^{K} S_D(i_D + n_{T,k} + n_{R,l}) \cdot \omega_{k,l}(\theta).$$

Figure 19A:
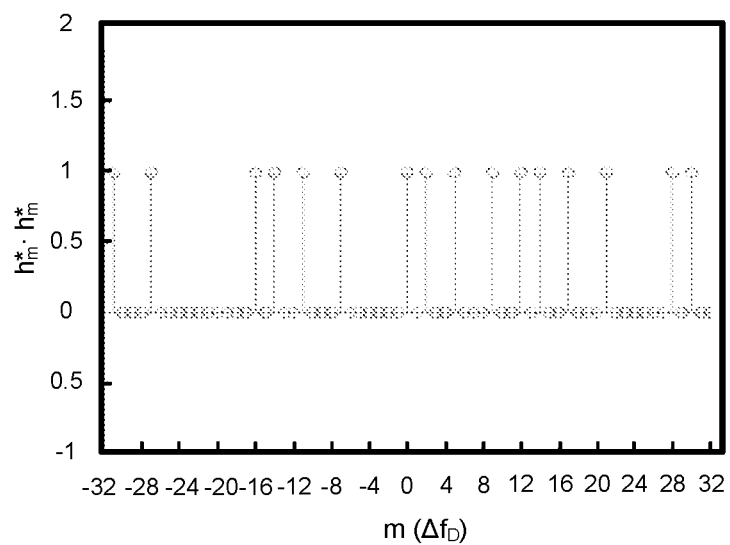
FIGS. 19A-19B are drawings illustrating an example of a Doppler spectrum for receive signals corresponding to transmit signals reflected off of a target with nested transmit and receive Doppler code multiplexing and a corresponding ambiguity function according to some embodiments of the present disclosure.
Figure 19B:
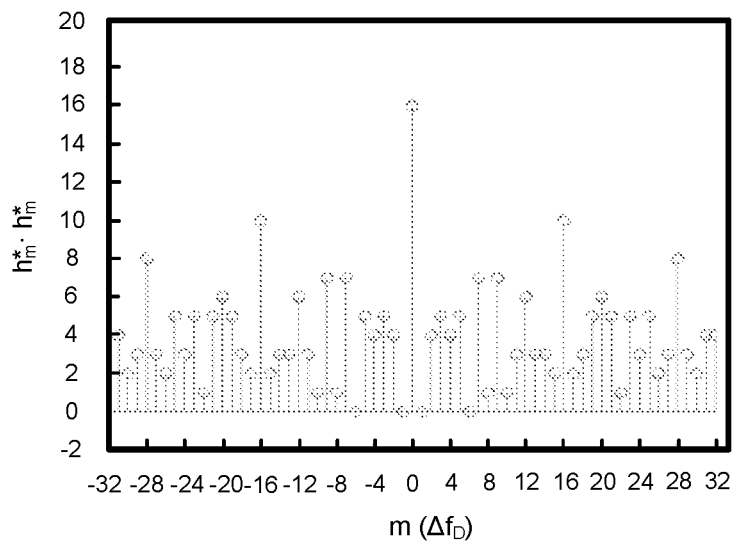

However, because $n_{k,l}$ is a nested code, it may have some non-unique elements. For example, consider the uniquely-spaced transmit and receive Doppler patterns $n_T=\{0, 12, 28, 48\}$ and $n_R=\{0, 2, 5, 9\}$. The resulting Doppler spectrum and ambiguity function are shown in FIGS. 19A-19B, which present drawings illustrating an example of a Doppler spectrum for receive signals corresponding to transmit signals reflected off of a single target with nested transmit and receive Doppler code multiplexing and a corresponding ambiguity function according to some embodiments of the present disclosure.

In some embodiments, the Doppler ambiguity function may be improved by applying Barker codes $B_T$ and $B_R$ to the matched filters of $n_T$ and $n_R$. (Note that a Barker code may be used in the circuit techniques instead of FMCW.) The Doppler-spatial matched filter operation may be expressed as $$S_{D,filt}(i_D, \theta) = \sum_{l=1}^{L}\sum_{k=1}^{K} S_D(i_D + n_{T,k} + n_{R,l}) \cdot B_{T,k}^* \cdot B_{R,l}^* \cdot \omega_{k,l}(\theta).$$

In some embodiments, different Barker codes or nested Barker codes are used for different chirps, for different transmit circuits and/or for different receive circuits.

Figure 20A:
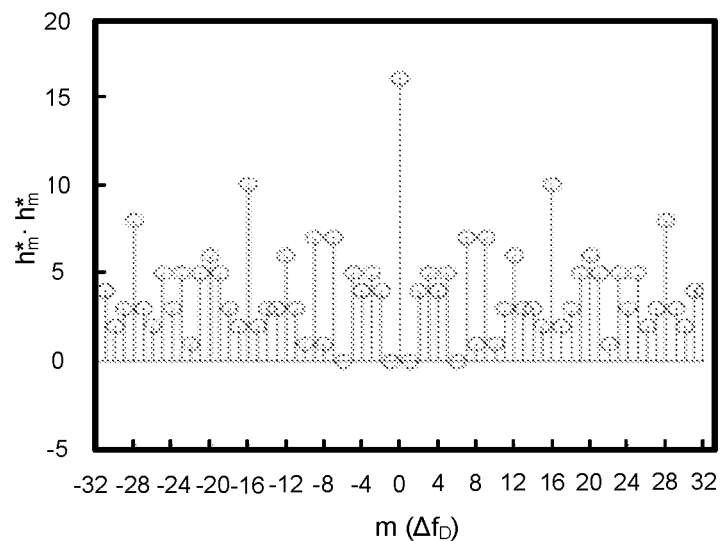
FIGS. 20A-20B are drawings illustrating an example of a comparison of an ambiguity function corresponding to a Doppler spectrum for receive signals corresponding to transmit signals reflected off of a target and encoded using Doppler code multiplexing at a transmit circuit and a receive circuit and an ambiguity function corresponding to a Doppler spectrum for receive signals corresponding to transmit signals reflected off of a target and encoded using Doppler code multiplexing and Barker codes at a transmit circuit and a receive circuit according to some embodiments of the present disclosure.
Figure 20B:
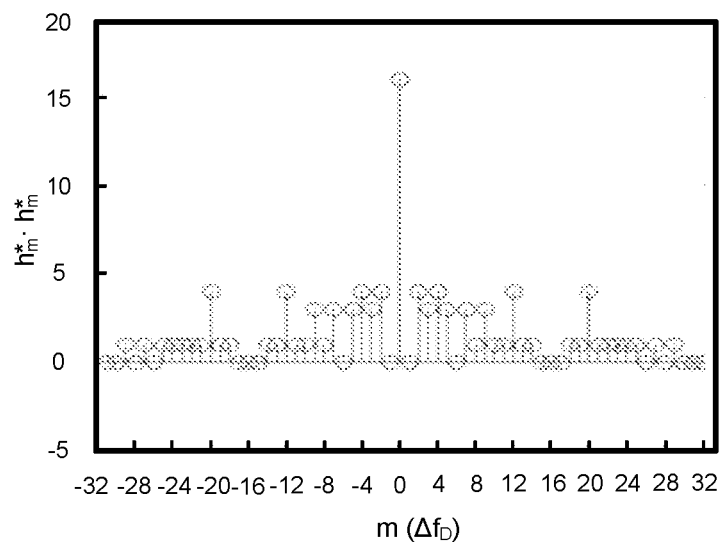

FIGS. 20A-20B presents drawings illustrating an example of a comparison of ambiguity functions corresponding to a Doppler spectrum for receive signals corresponding to transmit signals reflected off of a target and encoded using Doppler code multiplexing at a transmit circuit and a receive circuit and an ambiguity function corresponding to a Doppler spectrum for receive signals corresponding to transmit signals reflected off of a target and encoded using Doppler code multiplexing and Barker codes at a transmit circuit and a receive circuit according to some embodiments of the present disclosure. Notably, FIGS. 20A-20B are the results for matched filter autocorrelation using $n_T=\{0, 12, 28, 48\}$ and n=$\{0, 2, 5, 9\}$ without and with nested Barker codes $B_T \otimes B_R = B_4 \otimes B_4 = [0\ 0\ \pi\ 0] \otimes [0\ 0\ \pi 0] = [0\ 0\ \pi 0\ 0\ \pi 0\ \pi\pi 0\ \pi 00\pi 0]$. FIG. 20A shows the resulting ambiguity function with no pulse compression. The PSLR is 4.1 dB and ISLR is −23.5 dB. Moreover, FIG. 20B shows the resulting ambiguity function with the nested Barker code $B_{44}$. The PSLR is 12.0 dB and ISLR is −14.4 dB.

Figure 21:
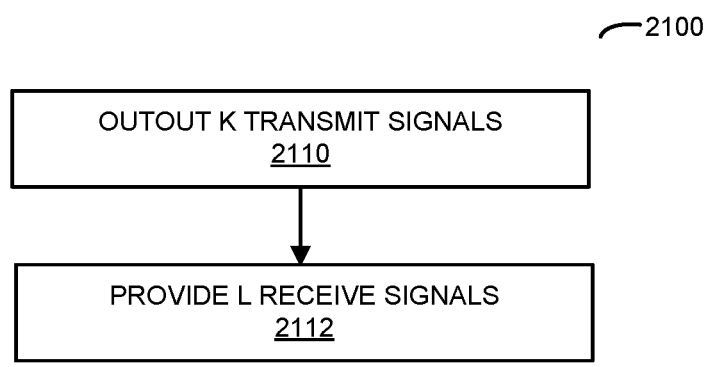
FIG. 21 is a flow diagram illustrating an example of a method for communicating encoded signals according to some embodiments of the present disclosure.

We now describe embodiments of a method. FIG. 21 presents a flow diagram illustrating an example of a method 2100 for communicating encoded signals, which may be performed by one or more integrated circuits. During operation, the one or more integrated circuits may output, using K transmit circuits, K transmit signals (operation 2110), where K is a non-zero integer and the K transmit signals are encoded using first Doppler code multiplexing. Moreover, the one or more integrated circuits may provide, using L receive circuits, L receive signals (operation 2112), where L is a non-zero integer and the L receive signals are encoded using second Doppler code multiplexing.

In some embodiments of the method 2100, there may be additional or fewer operations. Moreover, the order of the operations may be changed, and/or two or more operations may be combined into a single operation.

The disclosed integrated circuit and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, a vehicle, a ship, an airplane, a car, a truck, a bus, a motorcycle, manufacturing equipment, farm equipment, construction equipment, or another type of electronic device.

Although specific components are used to describe the embodiments of the integrated circuit and/or the integrated circuit that includes the integrated circuit, in alternative embodiments different components and/or subsystems may be present in the integrated circuit and/or the integrated circuit that includes the integrated circuit. Thus, the embodiments of the integrated circuit and/or the integrated circuit that includes the integrated circuit may include fewer components, additional components, different components, two or more components may be combined into a single component, a single component may be separated into two or more components, one or more positions of one or more components may be changed, and/or there may be different types of components.

Moreover, the circuits and components in the embodiments of the integrated circuit and/or the integrated circuit that includes the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, at least an integrated circuit may implement some or all of the functionality of the circuit techniques. This integrated circuit may include hardware and/or software mechanisms that are used for implementing functionality associated with the circuit techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   K transmit circuits configured to output K transmit signals, wherein K is a non-zero integer and the K transmit signals are encoded using first Doppler code multiplexing; and
   L receive circuits configured to provide L receive signals, wherein L is a non-zero integer and the L receive signals are encoded using second Doppler code multiplexing associated with the L receive circuits.

2. The integrated circuit of claim 1, wherein the L receive signals correspond to the K transmit signals.

3. The integrated circuit of claim 1, wherein the first Doppler code multiplexing, the second Doppler code multiplexing or both are different from Doppler division multiplexing.

4. The integrated circuit of claim 1, wherein a given transmit signal in the K transmit signals comprises M chirps in a frame and M is a non-zero integer; and
   wherein a given receive signal in the L receive signals comprise the M chirps in the frame.

5. The integrated circuit of claim 1, wherein, during the first Doppler code multiplexing, a $k^{th}$ transmit signal in the K transmit signals is selectively Doppler shifted by $n_k$ bins; and
   wherein the selective Doppler shift by $n_k$ bins selectively applied between M chirps in a frame in the $k^{th}$ transmit signal.

6. The integrated circuit of claim 1, wherein, during the second Doppler code multiplexing, an $l^{th}$ receive signal in the L receive signals is selectively Doppler shifted by $n_l$ bins; and wherein the selective Doppler shift by $n_l$ bins is selectively applied between M chirps in a frame in the lth receive signal.

7. The integrated circuit of claim 1, wherein, during the first Doppler code multiplexing, a phase shift corresponding to the Doppler shifted $n_k$ bins is selectively applied between M chirps in a frame in the $k^{th}$ transmit signal; and wherein differences between phase shifts selectively applied to different pairs of transmit signals in the K transmit signals are different.

8. The integrated circuit of claim 1, wherein, during the second Doppler code multiplexing, a phase shift corresponding to the Doppler shifted $n_l$ bins is selectively applied between M chirps in a frame in the $l^{th}$ receive signal; and wherein differences between phase shifts selectively applied to different pairs of receive signals in the L receive signals are different.

9. The integrated circuit of claim 1, wherein the integrated circuit is configured to compute a Doppler spectrum using the L receive signals and a matched filter corresponding to the first Doppler code multiplexing, the second Doppler code multiplexing, or both; and wherein the Doppler spectrum has a peak-to-sidelobe ratio (PSLR) greater than a predefined value.

10. The integrated circuit of claim 1, wherein L is different from K.

11. The integrated circuit of claim 1, wherein the first Doppler code multiplexing is different from the second Doppler code multiplexing.

12. The integrated circuit of claim 1, wherein the K transmit signals, the L receive signals, or both are encoded using one or more bipolar phase codes; and wherein a given bipolar phase code in the one or more bipolar phase codes changes a phase of a given transmit signal in the K transmit signals, a given receive signal in the L receive signals, or both within a given frame comprising M chirps; and wherein M is a non-zero integer.

13. The integrated circuit of claim 12, wherein the one or more bipolar phase codes comprise a Barker code or a nested Barker code.

14. The integrated circuit of claim 12, wherein a first bipolar phase code in the one or more bipolar phase codes used to encode the K transmit signals is different from a second bipolar phase code in the one or more bipolar phase codes used to encode the L receive signals.

15. The integrated circuit of claim 1, wherein the integrated circuit is configured to perform a sidelobe elimination technique; and wherein the sidelobe elimination technique comprises: recursive coherent sidelobe estimation; non-coherent sidelobe estimation; or inter-frame processing.

16. The integrated circuit of claim 1, wherein the K transmit circuits are configured to perform beamforming of the K transmit signals, the L receive circuits are configured to perform beamforming of the L receive signals, or both.

17. The integrated circuit of claim 1, wherein the L receive circuits are configured to encode the L receive signals using the second Doppler code multiplexing when down converting the L receive signals to baseband or an intermediate carrier frequency that is different from one or more carrier frequencies of the K transmit signals.

18. An electronic device, comprising:

an integrated circuit, wherein the integrated circuit comprises:
K transmit circuits configured to output K transmit signals, wherein K is a non-zero integer and the K transmit signals are encoded using first Doppler code multiplexing; and
L receive circuits configured to provide L receive signals, wherein L is a non-zero integer and the L receive signals are encoded using second Doppler code multiplexing associated with the L receive circuits.

19. The electronic device of claim 18, wherein the electronic device comprises a vehicle.

20. A method for communicating encoded signals, comprising:

by an integrated circuit:
outputting, using K transmit circuits, K transmit signals, wherein K is a non-zero integer and the K transmit signals are encoded using first Doppler code multiplexing; and
providing, using L receive circuits, L receive signals, wherein L is a non-zero integer and the L receive signals are encoded using second Doppler code multiplexing associated with the L receive circuits.

* * * * *